United States Patent Office 2,849,460
Patented Aug. 26, 1958

2,849,460

PURIFICATION OF STEROIDS

Helmuth Cords, New Brunswick, N. J., assignor to Olin Mathieson Chemical Corporation, New York, N. Y., a corporation of Virginia No Drawing. Application November 17, 1953
Serial No. 392,767

8 Claims. (Cl. 260—397.4)

This invention relates to the purification of steroids; and it has for its object the provision of an advantageous method of separating certain steroids from genetic contaminants, as well as the provision of valuable products derived from these steroids.

[The compounds $\Delta^4$-pregnene-11$\beta$,17$\alpha$, 21-triol-3,20-dione and its 11$\alpha$-epimer will for convenience be referred to herein as "F" and "epi F," respectively.]

In the production of epi F by microbiological oxidation [cf. J. Am. Chem. Soc., 74, 3962 (1952); U. S. patent application Serial No. 296,256, filed June 28, 1952], the product is obtained in colored impure form. It has been found that the epi F in the product can readily be separated from its genetic (colored) contaminants simply by converting the epi F into its chloroform adduct, recovering this adduct, and treating the adduct to obtain free epi F; and it has also been found that a number of related steroids can be converted into relatively stable adducts with various halo-alkanes, which adducts are similarly useful in the separation of the steroids from contaminants and for other purposes.

The adducts of the invention may be solvate complexes or embody halo-alkane of crystallization; but it is not intended that the invention be limited by any theoretical explanation. By virtue of their low solubility in the halo-alkane solvent (e. g. chloroform), crystallinity, substantially-quantitative formation, and relatively high stability to heat and/or vacuum (some being stable up to 0.5 mm. at 100$^\circ$ C.), production of these adducts provides a simple and efficient means of purifying the particular steroids.

The steroids found to form such adducts are F, epi F, epi F 11,21-diacetate, and $\Delta^{5,16}$-pregnadiene-3$\beta$-ol-20-one. The first three form adducts containing one mole halo-alkane/mole steroid, whereas the last forms an adduct containing one mole halo-alkane/two moles steroid. The preferred steroids for the purposes of this invention are the $\Delta^4$-pregnene-11,17$\alpha$,21-triol-3,20-diones (i. e. F. and epi F).

The halo-alkanes utilizable for the purposes of the invention are preferably relatively low-boiling chloro and bromo derivatives of methane and ethane, inter alia chloroform, bromo-form, methylene chloride, ethylene dichloride and sym. tetrachloroethane.

The adducts of this invention are formed on dissolving the steroid in the halo-alkane and reducing the dissolving power of the halo-alkane (e. g. by cooling the solution or removing solvent by evaporation). Preferably, the steroid is first at least partially purified to a crude- or semi-crystalline state. Alternatively (but less desirably), the adduct may be obtained by merely washing the steroid with the halo-alkane. If production of the adduct per se is the object, the starting material may of course be the pure steroid.

The (purified) free steroid may be obtained from the adduct by treatment with a different organic solvent for the steroid (i. e. a solvent other than an adduct-forming halo-alkane). Thus, the free steroid may be obtained by dissolving the choloroform adduct in methanol, and removing chloroform and methanol by evaporation (the binary system 12.5% methanol and 87.5% chloroform evaporating at 53.6$^\circ$ C.). Alternatively, where the adduct is relatively labile to heat and vacuum, it may be converted to the free steroid by such treatment.

The following examples are illustrative of the invention:

Example 1

(a) 500 mg. crude crystalline epi F [obtained, for example, by microbiological oxidation of 11-desoxy-17-hydroxy-corticosterone with *Aspergillus niger*, filtering the culture, extracting the filtrate with a substantially water-immiscible organic solvent for epi F, and removing the solvent by evaporation in vacuo] is dissolved in 200 ml. warm chloroform; and the crystals formed on cooling are recovered by filtration. The adduct thus obtained has the following properties: Colorless platelets. M. P., about 206–9$^\circ$ C. $[\alpha]_D^{23}+88^\circ\pm2$ (0.5% in ethanol), +87.8$^\circ$ being the calculated specific rotation for an adduct containing one mole of chloroform. Analysis, after drying in vacuo (1 mm. Hg) at 100$^\circ$ C. for two hours: C, about 54.92; H, about 6.59; and Cl, about 21.99 (calculated for $C_{21}H_{30}O_5 \cdot CHCl$: C, 54.83; H, 6.49; and Cl, 22.08). The infrared spectrum, sampled as Nujol mull, differs from that of free epi F in that it contains a deep band at 13.28 $\mu$, characteristic for chloroform; moreover, the $C_{20}$-carbonyl band shifts from 5.83 $\mu$ for the free steroid to 5.88 $\mu$ for the adduct.

(b) 664 mg. of the adduct obtained in a is dissolved in 50 ml. methanol, and the methanol removed with chloroform by evaporation at about 53.6$^\circ$ C. The residue is colorless crystalline free epi F.

Among the other organic solvents utilizable for conversion of the adduct to free epi F are other lower aliphatic alcohols (e. g. ethanol), acetone, ethyl acetate, and mixtures thereof.

Example 2

The 11,21-diacetate of epi F (i. e. $\Delta^4$-pregnene-11$\alpha$,17$\alpha$, 21-triol-3,20-dione 11,21-diacetate) is treated as described in section a of Example 1 to obtain its chloroform adduct (in which one mole of chloroform is associated with one mole of the steroid); and (if desired) the adduct is converted to free epi F 11,21-diacetate as described in section b.

Example 3

$\Delta^{5,16}$-pregnadiene-3$\beta$-ol-20-one is treated as described in section a of Example 1 to obtain a chloroform adduct (in which one mole of chloroform is associated with two moles of the steroid), having the following properties: Colorless platelets. Stable to vacuo (1 mm.), but labile to heat. M. P., same as that of the free steroid. $[\alpha]_D^{23°}-20\pm2$ (0.5% in ethanol), differing as expected, by 19% from that of the free steroid. Analysis: C, about 69.27; H, about 8.34; and Cl, about 14.21 (calculated for $C_{21}H_{30}O_2 \cdot \frac{1}{2}$ $CHCl_3$: C, 69.02; H, 8.22; and Cl, 14.22). The adduct shows a strong band at 13.32 $\mu$, characteristic for chloroform, and three additional bands at 10.54, 11.78 and 11.99 $\mu$; the $C_{20}$-carbonyl band shifts from 6.05 to 6.02 $\mu$ for the adduct, and four minor bands of the free steroid (8.62, 10.45, 12.41 and 12.52 $\mu$) appear at slightly lower wave lengths for the adduct; and the band at 9.86 $\mu$ is missing for the adduct.

The adduct may be converted to the free steroid as described in section b of Example 1.

Example 4

321.6 mg. compound F [hydrocortisone] (preferably crystalline) is dissolved in 150 ml. warm chloroform; and the crystals formed on cooling are recovered by filtration.

The adduct thus obtained has the following properties: Elongated flat needles which show birefringence. M. P., about 204–7° C. $[\alpha]_D^{25} + 129.2°$ (0.5 in ethanol), $+127.2°$ being the calculated specific rotation for a 32.9% increase in molecular weight. The adduct is stable to vacuum but relatively labile to heat and to combined vacuum and heat (1 mm. Hg, 100° C.). Its analysis is: C, about 54.8%; H, about 6.5%; and Cl, about 22% (analysis compound F: C, 69.58%; and H, 8.34%). The infrared spectrum shows the band typical for chloroform, and in addition the following changes:

| Compound F: | Chloroform adduct: |
|---|---|
| 7.82 ms | 7.87 sh |
| 8.33 ms | 8.33 h |
| 9.10 sh | 9.10 s |
| 9.73 w | 9.71 sh |
| 11.21 m | 11.21 w |
| 12.26 vw | |
| 12.39 sh | |

If desired, the adduct may be converted to free (purified) compound F by crystallizing from a lower aliphatic alcohol, acetone, ethyl acetate, or mixtures thereof; or, alternatively, it may be heated to about 100° C. under vacuum to free the steroid.

Example 5

237.7 mg. crystalline compound F is dissolved in 250 ml. hot ethylene dichloride; and the solution (which turns slightly brownish on heating) is evaporated to dryness, and the residue dried for 12–16 hours at room temperature under high vacuum. The increase in weight of the compound F corresponds well with that calculated for one mole ethylene dichloride. The adduct is relatively labile to combined heat (about 100° C.) and vacuum, and may be decomposed by such treatment to obtain free compound F.

The difference between the chloroform adducts of F and epi F in their lability to heat (and especially combined heat and vacuum) may be employed as a basis for a method of determining the amounts of these steroids in a mixture of the two, or for a method of separating F from epi F (using, for example, 100° C. and 1 mm. Hg vacuum).

Example 6

407.1 mg. epi F is dissolved in 250 ml. methylene chloride, and the solution is evaporated to dryness by means of a stream of air. The weight increase corresponds well for that calculated for one mole methylene chloride. The adduct is stable under high vacuum at room temperature.

Example 7

Employing ethylene dichloride in place of the methylene chloride in Example 6 yields a product whose weight increase corresponds well with that calculated for a monomolecular epi F-ethylene dichloride adduct.

Example 8

$\Delta^{5,16}$-pregnadiene-3$\beta$-ol-20-one forms adducts with methylene chloride and ethylene dichloride similar to the chloroform adduct described in Example 3. In each case, one mole of the haloalkane is associated with two moles of the steroid, the weights of the adducts (after high vacuum evaporation at room temperature) corresponding well with those calculated. In each case, the free steroid may be recovered by subjecting the adduct to high vacuum at 100° C.

Example 9

26 mg. compound F is dissolved in an excess of freshly-distilled bromoform, and the solution is evaporated to dryness, yielding a product whose weight increase corresponds well with a mono-molecular adduct.

Example 10

373 mg. compound F is dissolved in 150 ml. sym. tetrachloroethane, and the solution is evaporated to dryness at 30–40° C. with the aid of an air jet. The weight of the product corresponds well with that calculated for a mono-molecular adduct. It is stable to vacuum.

The adducts of this invention may be employed in place of the free steroid for various purposes. Thus, the chloroform adduct of epi F (cf. Example 1a) may be employed in place of free epi F in the conversion into cortisone acetate (e. g. as described in d alternative 2 of Example 4, application Serial No. 296,256).

The invention may be variously otherwise embodied within the scope of the appended claims.

I claim:

1. The method of separating a steroid of the group consisting of hydrocortisone, $\Delta^4$-pregnene-11-alpha,17-alpha,21-triol-3,20-dione, $\Delta^4$-pregnene-11-alpha,17-alpha,-21-triol-3,20-dione 11, 21-diacetate, and $\Delta^{5,16}$-pregnadiene-3$\beta$-ol-20-one from genetic contaminants, which comprises forming a halo-alkane adduct of the steroid, recovering the adduct, and treating the adduct to obtain the free steroid, the halo-alkane being a member of the group consisting of the relatively low-boiling chloro and bromo derivatives of methane and ethane.

2. The method of claim 1, in which the steroid is $\Delta^4$-pregnene-11-alpha,17-alpha,21-triol-3,20-dione produced by microbiological oxidation of 11-desoxy-17-hydroxycorticosterone.

3. The method of claim 1, in which the adduct is treated with a different organic solvent for the steroid under crystallization conditions.

4. The method of claim 1, in which the adduct is dissolved in a solvent of the group consisting of lower aliphatic alcohols, acetone, ethyl acetate, and mixtures thereof, and said solvent is removed with the halo-alkane by evaporation.

5. The method of claim 4, in which the solvent is methanol.

6. A crystalline halo-alkane adduct of a steroid of the group consisting of hydrocortisone, $\Delta^4$-pregnene-11-alpha,17 - alpha,21 - triol - 3,20 - dione, $\Delta^4$-pregnene - 11-alpha,17-alpha,21-triol-3,20-dione 11,21-diacetate, and $\Delta^{5,16}$-pregnadiene-3$\beta$-ol-20-one, the halo-alkane being a member of the group consisting of relatively low-boiling chloro and bromo derivatives of methane and ethane.

7. A crystalline chloroform adduct of a steroid of the group consisting of hydrocortisone, $\Delta^4$-pregnene-11-alpha,-17-alpha,21-triol-3,20-dione and $\Delta^4$-pregnene-11-alpha,-17-alpha,21-triol-3,20-dione 11,21-diacetate, in which the chloroform and steroid are in the molar ratio of 1:1.

8. A crystalline chloroform adduct of the steroid $\Delta^{5,16}$-pregnadiene-3$\beta$-ol-20-one, in which the chloroform and the steroid are in a molar ratio of 1:2.

References Cited in the file of this patent

UNITED STATES PATENTS 2,602,769    Murray et al. _____ July 8, 1952

UNITED STATES PATENT OFFICE
CERTIFICATE OF CORRECTION

Patent No. 2,849,460                      August 26, 1958

Helmuth Cords

It is hereby certified that error appears in the printed specification of the above numbered patent requiring correction and that the said Letters Patent should read as corrected below.

Column 1, line 43, for "1005 C.)," read -- 100° C.), --; column 2, line 25, for "CHCl:" read -- $CHCl_3$: --.

Signed and sealed this 11th day of November 1958.

(SEAL)
Attest:

KARL H. AXLINE                                ROBERT C. WATSON
Attesting Officer                             Commissioner of Patents